United States Patent Office 3,654,115
Patented Apr. 4, 1972

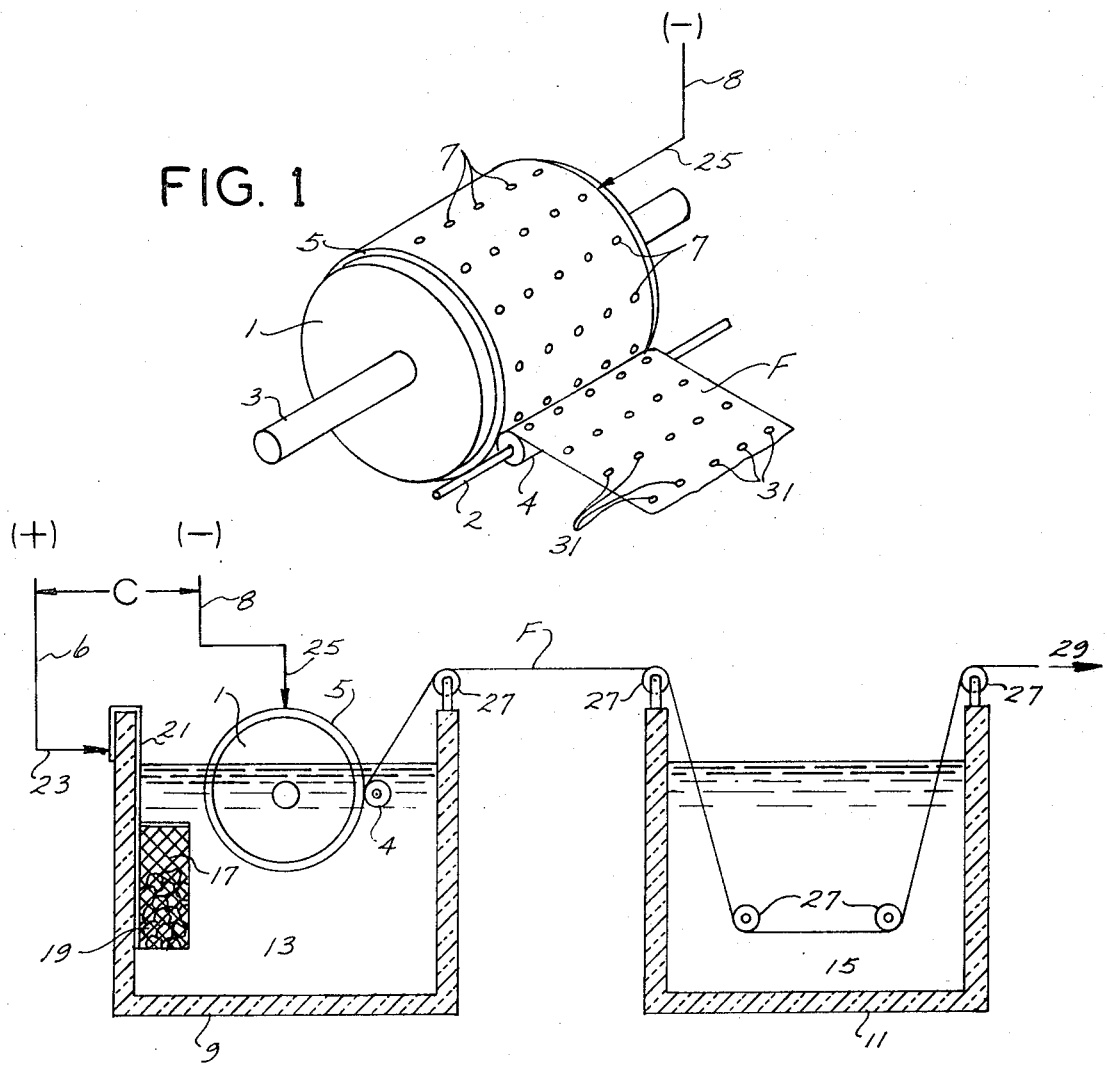

3,654,115
MANUFACTURE OF PERFORATED
METAL FOIL
Rene N. Langlais, Attleboro, Mass., assignor to Texas Instruments Incorporated, Dallas, Tex.
Filed Dec. 30, 1968, Ser. No. 787,440
Int. Cl. B23p 1/00
U.S. Cl. 204—216
1 Claim

ABSTRACT OF THE DISCLOSURE

A rotatable mandrel forms an electrode for electroplating, being formed by an insulating cylinder surrounded by an attached closely fitting cylindrical sleeve of metal through which holes are formed. In the holes are masses of hardened nonconductive filler material forming slugs, the outer surfaces of which are coextensive with the cylindrical form of the sleeve. A small crevice forms an outline in the cylindrical sleeve surface around each slug. Each crevice contains a jelly-like insulating substance disposed according to said outline. The mandrel is caused to rotate in an electrolytic metal-plating bath. The jelly-like substance is selected so as not to contaminate the bath. Electrolytic deposition forms a perforated plated skin on the sleeve. The plating is then stripped from the sleeve and moved through a cleaning bath. The result is an accurately perforated, uniform untorn metal foil strip.

A problem has arisen in connection with the stripping of perforated nickel foil from rotating stainless-steel sleeves having perforations infilled with hardened slugs of insulation and rotating in an electrolyte. This is because there has been a tendency for the perforated foil as it is stirpped to adhere to the sleeve along the outlines of the slugs, thus tending to tear the foil and/or produce inaccurate perforations in the end product. The reason for this is that a continuous thin linear crevice exists around the outside edge of the nonconductive slug and the adjacent edge of the conductive sleeve in which the slug is located. This crevice admits of some uneven plating therein or thereabouts which interferes with the stripping of the foil from the sleeve, even to the extent of tearing it. Besides, the accuracy of the perforations is reduced in the foil. According to the present invention such crevices are infilled with a jelly-like release or parting material which is harmless to the electrolyte and which will reject plating along the line of each crevice. The result is that the foil may, without tearing, be cleanly stripped from the sleeve and will contain highly accurate perforations.

Referring now to the drawings.

FIG. 1 is a three-dimensional view illustrating the stripping of nickel foil from a rotating mandrel; and FIG. 2 is a diagrammatic view illustrating the plating process which employs the invention.

Corresponding reference characters indicate corresponding parts throughout the two views.

Referring to the drawings, numeral 1 illustrates a rotatable cylinder of epoxy resin on a supporting shaft 3. While shown as solid, it may be in the form of a hollow cylinder. Around the cylinder 1 is a closely fitting sleeve 5 of stainless-steel through which is formed a pattern of holes 7. The holes 7 are infilled with initially soft but finally hardened silicone rubber, epoxy resin or the like. Infilling is, for example, accomplished by smearing silicone rubber, epoxy resin or the like, while soft, on the surface of the sleeve 5, forcing the rubber into the holes 7, and then wiping the surface clean. Conventional hardeners may be included with these materials so that they harden as slugs in the holes. Hardening is accomplished in the conventional manner as by use of appropriate catalyzers and/or heating. Thus there is formed a hard slug in each hole. A cylindrical working surface is then provided by matching or sanding on a lathe or the like so that the sleeve 5 presents an essentially smooth cylindrical conductive surface in which are islands of exposed electrical insulation constituted by the exposed ends of the hardened silicone rubber or epoxy resin. While the outer surfaces of each infilling are cylindrical and flush with the cylindrical face of the sleeve 5, the hardening action results in minute linear crevices extending around each slug in said cylindrical surface. Silicone rubber is a product of the Dow-Corning Company of Corning, New York. It and the process of developing it into hardened condition is well-known, no further description is required. An appropriate epoxy useful for the invention is, for example, epichlorohydrin reacted with a polyhydroxy compound such as bisphenol A in the presence of a catalyst such as a short chain amide, for example dicyandiamide. It and the means for developing it into hardened condition are also well known.

A sleeve such as 5 is exteriorly smeared with a release compound such as silicone grease (a Dow-Corning product), or a petroleum jelly, such as "Vaseline" for example. The entire surface of the sleeve is covered with such a material and then the sleeve is wiped thoroughly clean to remove the material from all of its surface and the outer cylindrical surfaces of the slugs in the holes. However, such release material will enter the above described crevices which outline the outer faces of the slugs in each hole 7, where the material remains for an indefinitely long time. It is chosen so as not to contaminate the plating solution to be described and so as to be non-wetted in the plating solution.

Referring to FIG. 2, numerals 9 and 11 indicate nonconductive containers for a plating bath 13 and wash water 15, respectively. Suitable trunnions (not shown) are located in the container 9 for the shaft 3 so that the assembly 1, 5, 7 becomes partially immersed in the plating bath 13. Trunnions (not shown) are also provided for a shaft 2 supporting a take-off roller 4. In the bath 13 is immersed a conductive wire basket 17 in which are pieces of nickel 19 forming an anode. The basket 17 is supported by a connected conductive bracket 21 to which a connection 23 is made to one side 6 of an electric circuit C. To the stainless-steel sleeve 5 is made another connection 25 to the other side 8 of the circuit C.

The plating bath 13 may be of the nickel sulfamate type as follows:

Nickel sulfamate $Ni(SO_3NH_2)_2$: 360 grams/liter
Nickel chloride $NiCl_2 \cdot 6H_2O$: 10–15 grams/liter
Boric acid $H_3BO_3$: 35–40 grams/liter This plating bath is an aqueous solution having a pH between 3.5 and 4.5. In a typical application, in which the drum length is about 14 inches and a 2–3 mil thickness of foil F is to be formed, the plating will be performed under a current of 300 amperes under 10 volts at a linear speed of advance of about 15 inches per hour, achieved by appropriate rotation of the sleeve.

The bath is replenished by replacing nickel anode material 19 in the basket 17 from time to time. For ease in plating, the nickel anode material may comprise nickel having a small sulfur content but otherwise is substantially pure. This is to avoid passivation of the anode during the plating operation. This sulfur content in the nickel facilitates corrosion of the anode 19 with consequent introduction of nickel into the plating bath 13. The sleeve 5 acts as the cathode on which a thin layer of nickel develops.

From the above it will be apparent that, as the stainless-steel sleeve 5 rotates, there will be plated on its moving underside a thin layer of nickel, except over areas within the crevices and occupied by the infilling in the holes 7. The nickel may then be stripped and led over the guide roll 4, out of bath 13 and then over rolls 27 for passage through the washing bath of water 15. Suitable draw means indicated by the dart 29 keeps the process in continuous operation with the result shown in FIG. 1 wherein F indicates the finished foil. The desired cleanly formed perforations are shown at 31.

It will be understood that other than circular holes 7, slugs and perforations 31 may be provided by providing the appropriate shapes of holes through the stainless-steel sleeve 5. It will also be appreciated that, although the production of perforated nickel foil has been described, foils of other metals may be made by the same process, such as for example copper, silver, iron, gold, platinum or other nonbrittle metals capable of self-support in foil form. For suitable electroplating baths for various metals, see for example, p. 2,771 of the second edition of Perry's Chemical Engineers' Handbook.

It will be clear to those skilled in the art that silicone grease and "Vaseline" are but examples of various substances of jelly-like form that will enter and remain in crevices and which will not contaminate a selected plating solution.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A plating apparatus for use in a sulfamate nickel plating bath comprising a sleeve of stainless steel having a cylindrical outer surface and having a plurality of openings in said surface, means supporting said sleeve for rotation on the axis of said cylindrical sleeve surface, slugs of electrically insulating materials selected from the group consisting of silicone rubber and epoxy resin disposed in said sleeve openings, said slugs having cylindrical end surfaces flush with said cylindrical sleeve surface to form a cyclindrical working surface and having crevices between said slugs and sleeve which open on said working surface, and silicone grease filling said crevices.

References Cited

UNITED STATES PATENTS

| 2,166,366 | 7/1939 | Norris | 204—11 |
| 2,870,068 | 1/1959 | Schaer | 204—11 |
| 2,226,381 | 12/1940 | Norris | 204—11 |
| 2,226,382 | 12/1940 | Norris | 204—11 |
| 2,332,592 | 10/1943 | Norris | 204—11 |
| 3,061,525 | 10/1962 | Grazen | 204—212 X |
| 3,094,476 | 6/1963 | Francis | 204—281 X |
| 3,167,489 | 1/1965 | Hadjian | 204—11 |
| 3,230,163 | 1/1966 | Dreyfus | 204—281 |
| 3,489,666 | 1/1970 | Nordblom et al. | 240—208 |

OTHER REFERENCES

Materials Application Guide, Dow Corning, 1967.
News from Dow Corning, July 14, 1964, Dow Corning.

JOHN H. MACK, Primary Examiner

R. J. FAY, Assistant Examiner

U.S. Cl. X.R.

204—11, 208, 212, 281